(12) United States Patent
Goodman

(10) Patent No.: US 7,036,880 B1
(45) Date of Patent: May 2, 2006

(54) INFANT CAR SEAT ASSEMBLY FOR SIMULATING A MOBILE VEHICLE

(76) Inventor: Peter J. Goodman, 15 Windwood Dr., Nesconset, NY (US) 11767

( * ) Notice: Subject to any disclaimer, the term of this patent is extended or adjusted under 35 U.S.C. 154(b) by 84 days.

(21) Appl. No.: 10/874,675

(22) Filed: Jun. 24, 2004

(51) Int. Cl.
*A47D 13/10* (2006.01)
*A47D 1/10* (2006.01)

(52) U.S. Cl. ............................ 297/250.1; 297/256.16; 297/260.2; 297/273; 297/274

(58) Field of Classification Search ............. 297/250.1, 297/256.16, 260.2, 273, 274
See application file for complete search history.

(56) References Cited

U.S. PATENT DOCUMENTS

| | | | |
|---|---|---|---|
| 3,758,156 A * | 9/1973 | Zawadzki | ................. 297/260.2 |
| 4,615,059 A * | 10/1986 | Darowski | ................ 297/273 X |
| 4,620,334 A | 11/1986 | Robinson | |
| 4,656,680 A | 4/1987 | Wilson | |
| D305,584 S | 1/1990 | Spilman et al. | |
| 5,566,370 A | 10/1996 | Young | |
| 5,588,164 A | 12/1996 | Proulx | ................. 297/260.2 X |
| 5,711,045 A | 1/1998 | Caster et al. | |
| 6,059,667 A * | 5/2000 | Pinch | ...................... 297/273 X |
| 6,224,380 B1 | 5/2001 | Lo et al. | |
| 6,437,759 B1 | 8/2002 | Turner et al. | |
| 6,519,792 B1 | 2/2003 | Chen | |
| 2002/0113469 A1* | 8/2002 | Stern et al. | ............ 297/256.16 |

* cited by examiner

*Primary Examiner*—Rodney B. White

(57) ABSTRACT

An infant car seat assembly includes a housing having a base member secured thereto and a top opening disposed generally medially thereof. A plurality of belts are connected to a mechanism for rotating same at select speeds. Such a mechanism is selectively controllable by an operator. The housing further includes a support member connected to the base member. An infant seat carrier is connected to the support member and includes a lower surface and a plurality of wheels connected thereto. A plurality of scenic window flaps are connected to the support member respectively to thereby provide a scenic view for an infant seated above the seat carrier.

18 Claims, 5 Drawing Sheets

INFANT CAR SEAT ASSEMBLY FOR SIMULATING A MOBILE VEHICLE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to an infant car seat toy assembly and, more particularly, to an infant car seat toy assembly for simulating a mobile vehicle.

2. Prior Art

It has been widely appreciated that imparting movement to a child will relax the child and possibly induce sleep. A swinging or oscillating movement (i.e. pivoting about an axis disposed in a fixed location) is quite a different motion for a body to be subjected to than is that from a rocking movement. Old and young alike seem to derive relaxation as a result of being subjected to a rocking action, which involves a moving pivot axis. As a result, parents through the ages have utilized rocking chairs and rocking cradles and more recently have even transported their children in automobiles in order to induce sleep.

A conventional baby carriage generally is not equipped with any power source. Alternatively, a power supply may be mounted on the main body of the baby carriage. With respect to the former, it is laborious to use the baby carriage outdoors. With respect to the latter, it is less strenuous to use the baby carriage outdoors. However, when used indoors, the function of the baby carriage is still impractical.

When using the baby carriage indoors, a baby is generally placed in the baby carriage, which is then pushed and pulled back and forth to help the baby to fall asleep. Such reciprocating movement is monotonous and laborious and it is impossible to take care of other things when pushing and pulling the baby carriage back and forth.

Also, various devices have been developed which automatically rock the infant, either in a side-to-side or forward-to-back motion. By providing such an automatic device, the parent is released from the task of manually rocking the child and can perform other duties. However, the automatic devices, which have been heretofore developed have certain disadvantages. In particular, they move the infant in a repetitive simple motion involving a limited number of degrees of freedom, typically two degrees of freedom or less.

Accordingly, a need remains for an infant car seat assembly for simulating a mobile vehicle, which overcomes the above-noted shortcomings.

BRIEF SUMMARY OF THE INVENTION

In view of the foregoing background, it is therefore an object of the present invention to provide an infant car seat assembly for simulating a mobile vehicle. These and other objects, features, and advantages of the invention are provided for by an infant car seat assembly including a housing that has a base member secured thereto and extending along a length thereof. The housing is conveniently positionable on a support surface and has a top opening disposed generally medially thereof.

The present invention further includes a support member that has a plurality of lower end portions connected to the base member and extending substantially vertically therefrom respectively. The support member further has an upper end portion spaced from the plurality of lower end portions that extends across a width of the base member, wherein the support member is pivotally connected to the base member and foldable between raised and lowered positions.

The assembly preferably includes a plurality of handles attached to the upper end portion of the support member and the base member, respectively, for conveniently assisting a user to transport the assembly between remote positions. A quick-release locking latch may also be secured adjacent to one of the plurality of handles for removably engaging the base member when the assembly is moved to a folded position.

The assembly also includes an infant seat carrier connected to the support member that has a lower surface including a plurality of wheels connected thereto. The infant seat carrier further includes a plurality of fastening members connected thereto that are positionable about the housing for advantageously maintaining the assembly at a substantially stable position during non-operating conditions.

The assembly further includes a connector that has opposed end portions pivotally connected to the seat carrier and the support member, respectively, for effectively allowing the seat carrier to oscillate during operating conditions.

The present invention further includes a plurality of belts disposed within the housing for receiving the infant seat carrier thereon through the top opening. The plurality of belts preferably have a plurality of corresponding non-linear track portions formed therein for receiving and guiding the plurality of wheels therethrough to effectively simulate the natural movement of an oscillating vehicle.

Advantageously a mechanism for rotating the plurality of belts at a select speed is also included in the present invention so that the infant seat carrier can be rolled thereon for simulating a moving vehicle. Such a rotating mechanism is disposed within the housing and is conveniently selectively controllable by an operator. The rotating mechanism includes a power source and a motor connected to the power source, including a drive shaft extending forwardly therefrom. The motor may further include a variable gear connected to the drive shaft that is controllable by the switch so that an operator can advantageously control a rotating speed of the plurality of belts.

The rotating mechanism further includes a plurality of axles supporting the plurality of belts, wherein one of the plurality of axles is operably connected to the drive shaft and is contemporaneously rotatable therewith. A switch disposed at the upper end portion of the support member is conveniently connected to the rotating mechanism for selectively controlling same.

The present invention also includes a plurality of oppositely disposed scenic window flaps connected to the support member respectively and extending along a length of the housing to thereby advantageously provide a scenic view for an infant seated above the seat carrier. The plurality of scenic window flaps may be pivotally connected to the support member to thereby become selectively movable between latitudinal and longitudinal positions, and may further be pivotal between raised and lowered positions as desired by a user.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
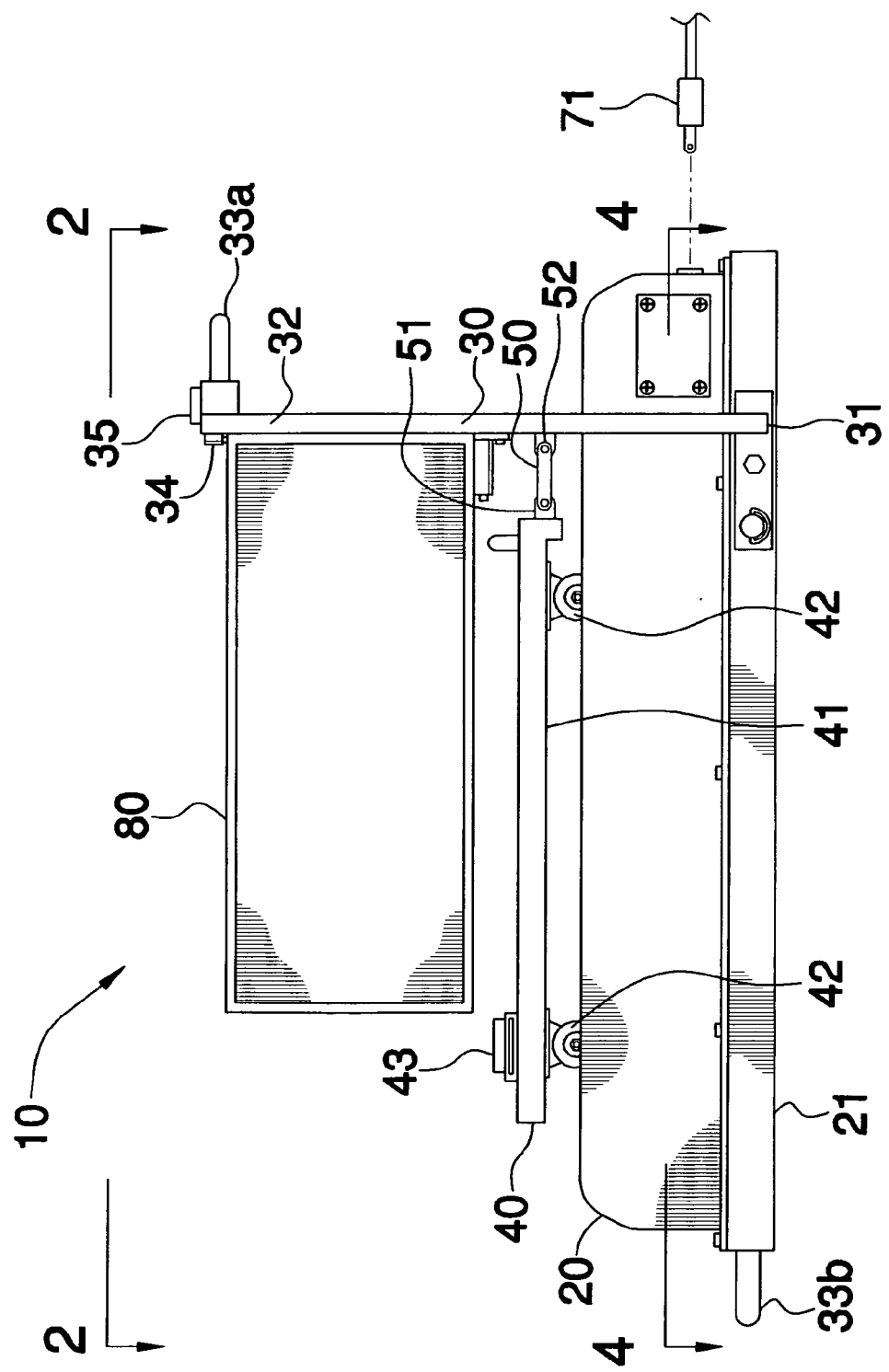
FIG. 1 is a side elevational view showing an assembly for an infant car seat simulating a mobile vehicle, in accordance with the present invention.
Figure 2:
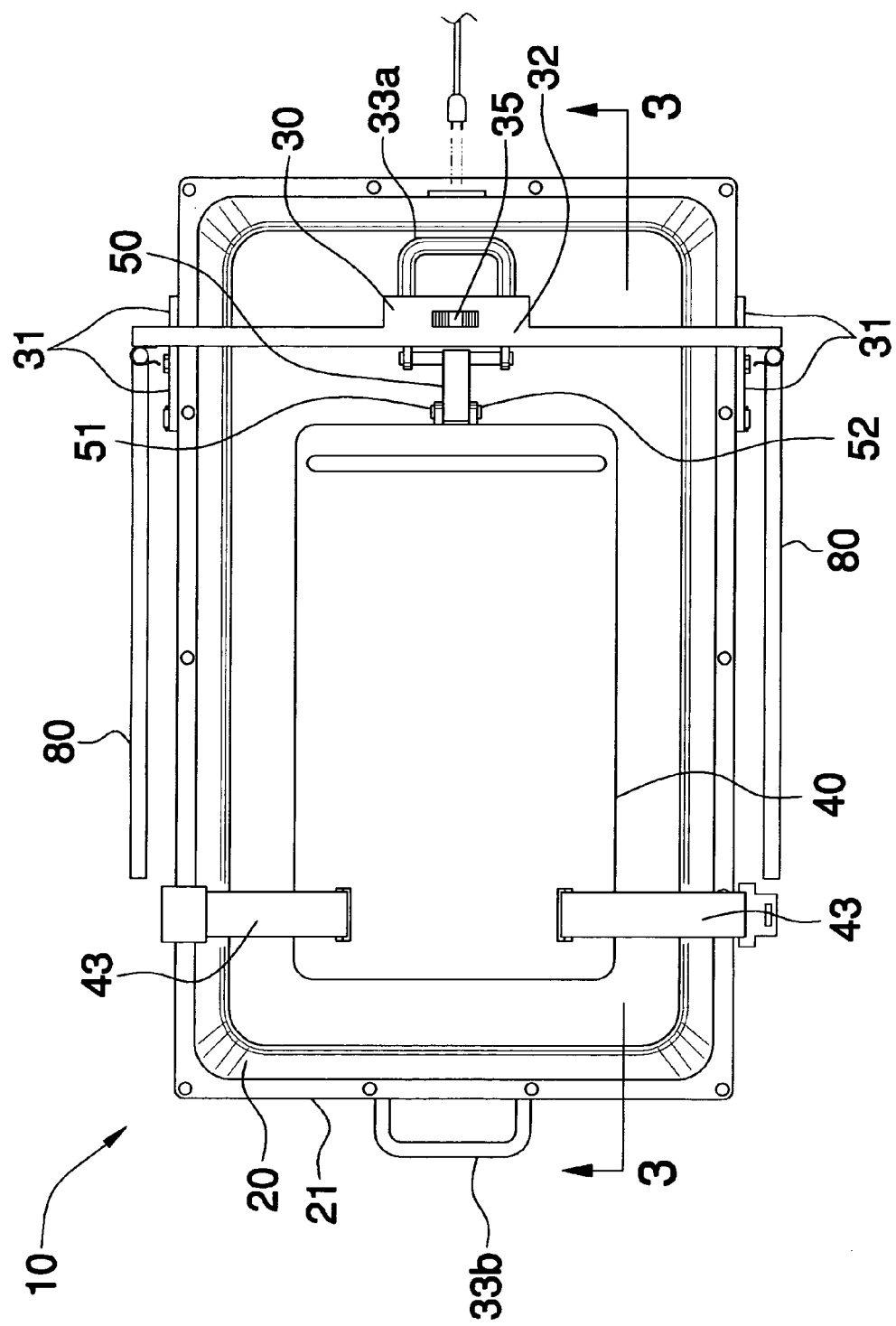
FIG. 2 is a top plan view of the assembly shown in FIG. 1 taken along line 2—2.
Figure 3:
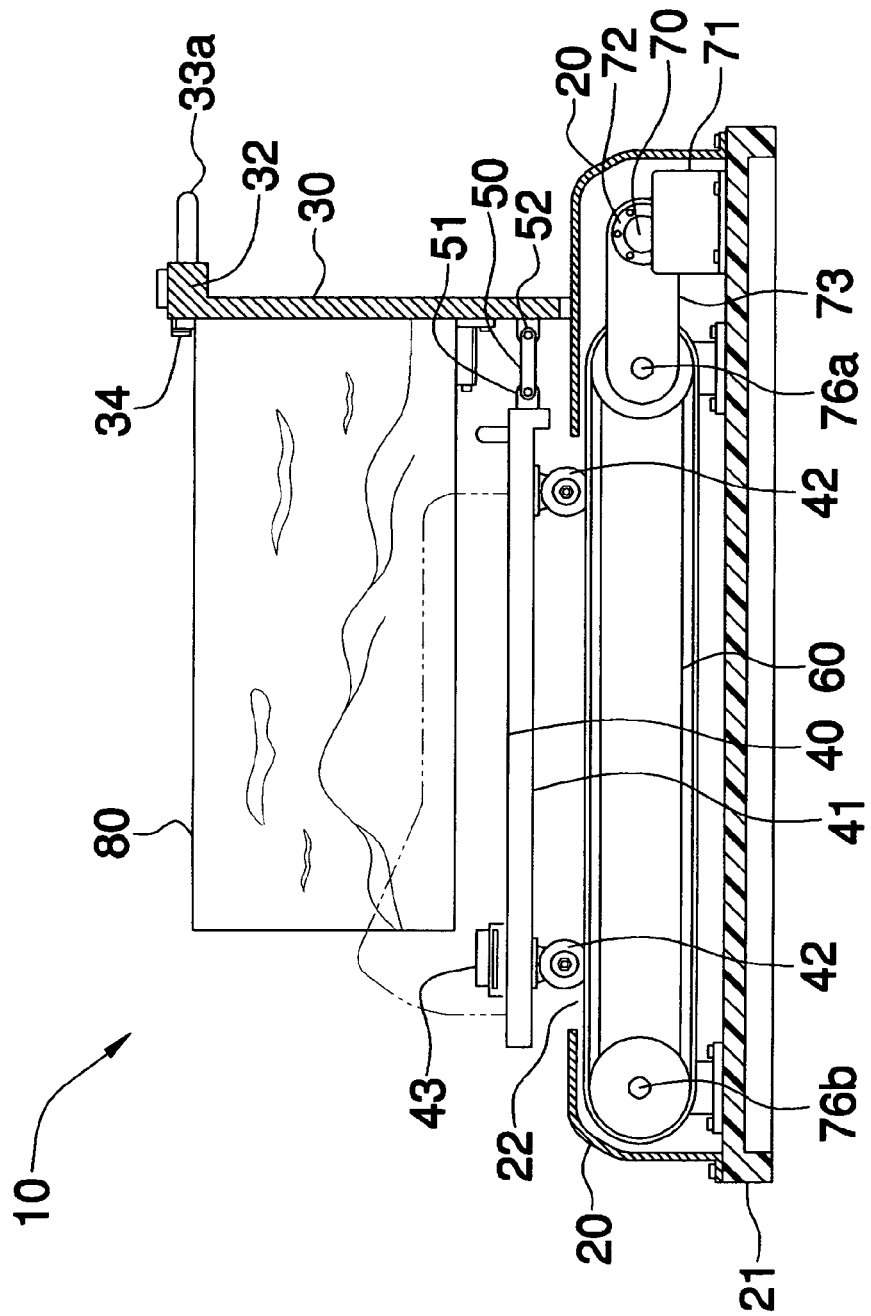
FIG. 3 is a cross-sectional view of the assembly shown in FIG. 1 taken along line 3—3 in FIG. 2.
Figure 4:
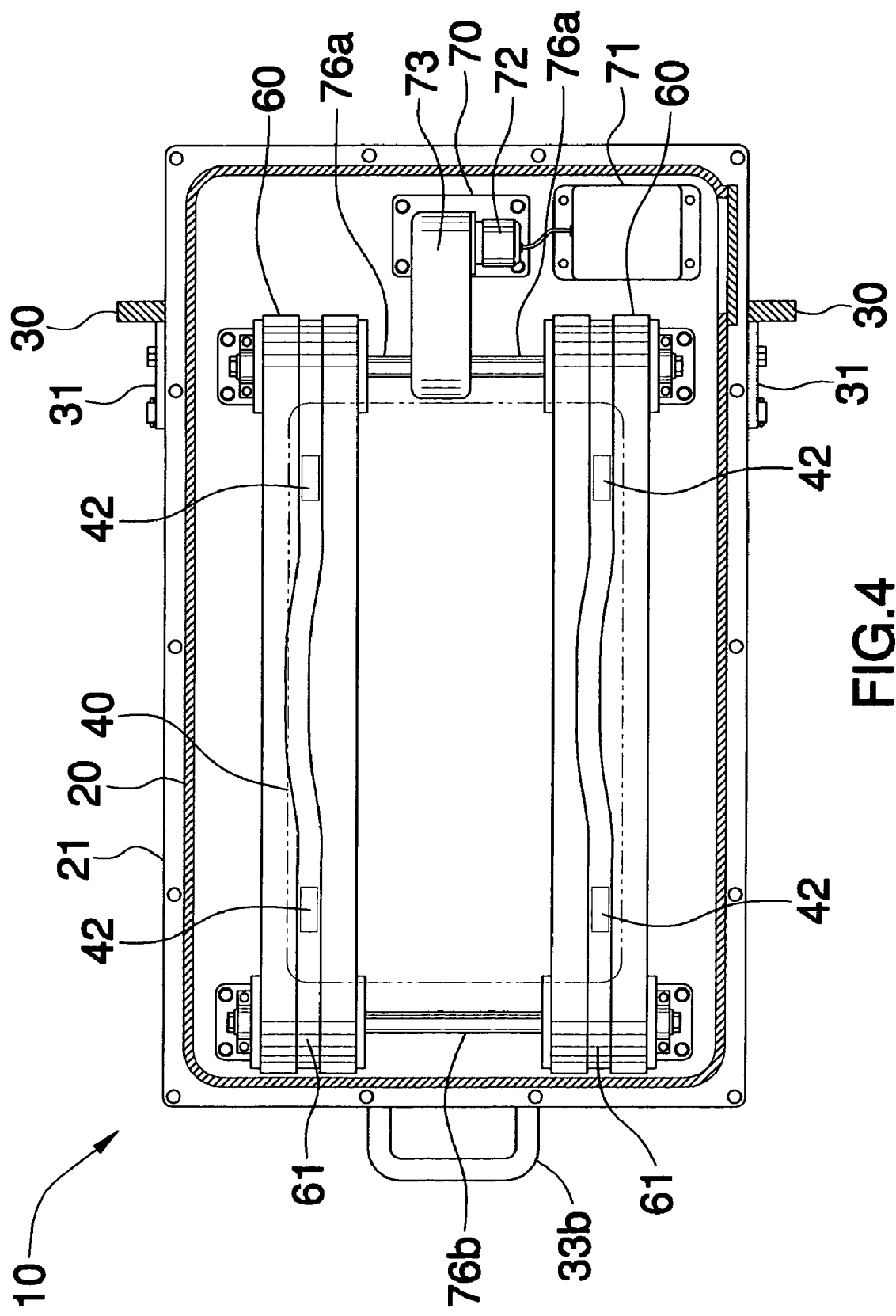
FIG. 4 is a cross-sectional view of the assembly shown in FIG. 1 taken along line 44.
Figure 5:
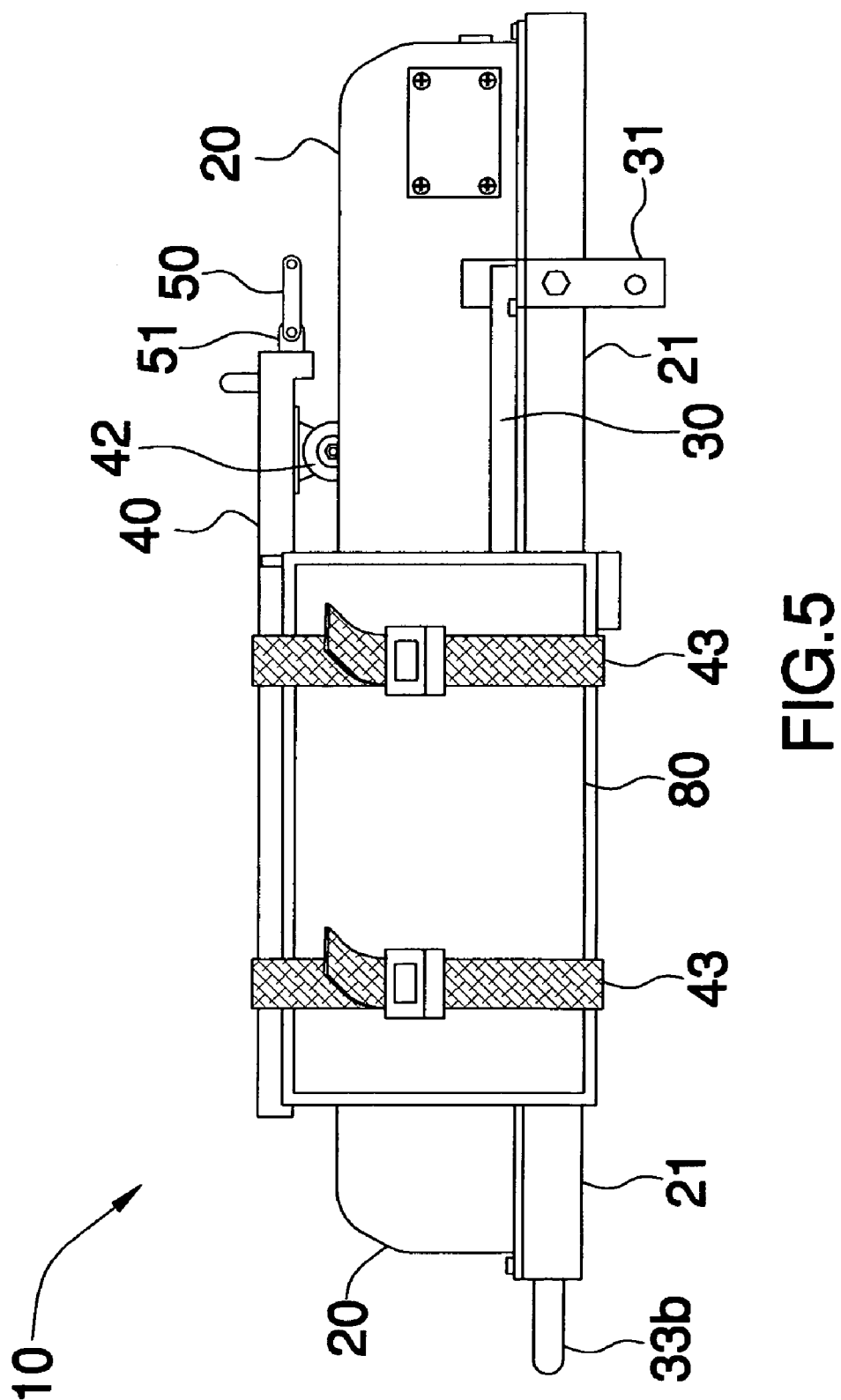
FIG. 5 is a side-elevational view showing the present invention at a folded position.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–4 by the reference numeral 10 and is intended to provide an infant car seat assembly for simulating a mobile vehicle. It should be understood that the assembly 10 may be used to simulate many different types of situations or environments that might be soothing to a child.

Referring initially to FIG. 1, an infant car seat assembly 10 includes a housing 20 that has a base member 21 secured thereto and extending along a length thereof. The housing 20 is conveniently positionable on a support surface and has a top opening 22 disposed generally medially thereof.

The present invention further includes a support member 30 that has a plurality of lower end portions 31 connected to the base member 21 and extending substantially vertically therefrom respectively. The support member 30 further has an upper end portion 32 spaced from the plurality of lower end portions 31 that extends across a width of the base member 21, wherein the support member 30 is pivotally connected to the base member 21 and foldable between raised and lowered positions. Folding the support member 30 allows the assembly 10 to be adapted into a more compact shape, thereby resulting in valuable space savings upon storing of the assembly 10.

The assembly 10 includes a plurality of handles 33a, b attached to the upper end portion 32 of the support member 30 and the base member 21, respectively, for conveniently assisting a user to transport the assembly 10 between remote positions. A quick-release locking latch 34 is also secured adjacent to one of the plurality of handles 33a for removably engaging the base member 21 when the assembly 10 is moved to a folded position.

The assembly also includes an infant seat carrier 40 connected to the support member 30 that has a lower surface 41 including a plurality of wheels 42 connected thereto. The infant seat carrier 40 further includes a plurality of fastening members 43 connected thereto that are positionable about the housing 20 for advantageously maintaining the assembly 10 at a substantially stable position during non-operating conditions.

The assembly 10 further includes a connector 50 that has opposed end portions 51, 52 pivotally connected to the seat carrier 40 and the support member 30, respectively, for effectively allowing the seat carrier 40 to oscillate during operating conditions. The oscillating movement of the seat carrier 40 will enhance the assembly's ability to simulate a moving vehicle and will also serve as a soothing movement that tends to lull babies to sleep.

The present invention further includes a plurality of belts 60 disposed within the housing 20 for receiving the infant seat carrier 40 thereon through the top opening 22. The plurality of belts 60 have a plurality of corresponding non-linear track portions 61 formed therein for receiving and guiding the plurality of wheels 42 therethrough to effectively simulate the natural movement of an oscillating vehicle. Just as the connector 50 improved the effect of the assembly 10, the plurality of belts 60 will also advantageously add to the virtual reality of the present invention.

Advantageously a mechanism 70 for rotating the plurality of belts 60 at a select speed is also included in the present invention so that the infant seat carrier 40 can be rolled thereon for simulating a moving vehicle. Such a rotating mechanism 70 is disposed within the housing 20 and is conveniently selectively controllable by an operator. Controlling the rotating mechanism 70 allows a user to find a setting that is most effective at calming and entertaining a young infant, thus optimizing the usefulness of the assembly 10. The rotating mechanism 70 includes a power source 71 and a motor 72 connected to the power source 71, including a drive shaft 73 extending forwardly therefrom. The motor 72 further includes a variable gear (not shown) connected to the drive shaft 73 that is controllable by the switch 35 so that an operator can advantageously control a rotating speed of the plurality of belts 60.

The rotating mechanism 70 further includes a plurality of axles 76a,b supporting the plurality of belts 60, wherein one of the plurality of axles 76a is operably connected to the drive shaft 73 and is contemporaneously rotatable therewith. A switch 35 disposed at the upper end portion 32 of the support member 30 is conveniently connected to the rotating mechanism 70 for selectively controlling same.

The present invention also includes a plurality of oppositely disposed scenic window flaps 80 connected to the support member 30 respectively and extending along a length of the housing 20 to thereby advantageously provide a scenic view for an infant seated above the seat carrier 40. The plurality of scenic window flaps 80 are pivotally connected to the support member 30 to thereby become selectively movable between latitudinal and longitudinal positions, and can further be pivoted between raised and lowered positions as desired by a user. Pivoting the window flaps 80 in alternate planes allows the user to quickly adjust the scenes so that an infant is allowed to effectively view the scenery from various lines of sight.

The assembly 10 is also ideal for parents of twins, triplets, or other multiples, who cannot possibly hold and comfort the babies as often as they may like. With the assembly 10, the "ride" may take place in the comfort of a nursery, and can be easy to transfer the baby to his/her bed after he/she falls asleep, instead of trying to remove them from an actual car. A practical baby care product such as the assembly 10 is a welcome addition to any household with young infants, day care centers, or baby sitting services.

While the invention has been described with respect to a certain specific embodiment, it will be appreciated that many modifications and changes may be made by those skilled in the art without departing from the spirit of the invention.

It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An infant car seat assembly comprising:
    a housing including
        a base member secured thereto and extending along a length thereof, said housing being positionable on a support surface and having a top opening disposed generally medially thereof, and
        a support member having a plurality of lower end portions connected to said base member and extending substantially vertically therefrom respectively, said support member further having an upper end portion spaced from said plurality of lower end portions and extending across a width of said base member, said support member being pivotally connected to said base member and foldable between raised and lowered positions;
    an infant seat carrier connected to said support member and having a lower surface and including a plurality of wheels connected thereto, said infant seat carrier further including a plurality of fastening members connected thereto and being positionable about said housing for maintaining said assembly at a substantially stable position during non-operating conditions;
    a plurality of belts disposed within said housing and for receiving said infant seat carrier thereon through said top opening;
    means for rotating said plurality of belts at a select speed so that said infant seat carrier is caused to roll thereon and simulate a moving vehicle, said rotating means being disposed within said housing and being selectively controllable by an operator; and
    a plurality of oppositely disposed scenic window flaps connected to said support member respectively and extending along a length of said housing to thereby provide a scenic view for an infant seated above said seat carrier.

2. The assembly of claim 1, further comprising:
    a connector having opposed end portions pivotally connected to said seat carrier and said support member respectively, said connector member allowing said seat carrier to oscillate during operating conditions.

3. The assembly of claim 1, wherein said plurality of scenic window flaps are pivotally connected to support member to thereby become selectively movable between latitudinal and longitudinal positions, said plurality of scenic window flaps further being pivotal between raised and lowered positions as desired by a user.

4. The assembly of claim 1, wherein said plurality of belts have a plurality of corresponding track portions formed therein, said plurality of track portions being non-linear and for receiving and guiding said plurality of wheels therethrough to simulate natural oscillating vehicle movement.

5. The assembly of claim 1, further comprising:
    a plurality of handles attached to said upper end portion of said support member and said base member respectively for assisting a user to transport said assembly between remote positions; and
    a quick-release locking latch secured adjacent one said plurality of handles and for removably engaging said base member when said assembly is moved to a folded position.

6. The assembly of claim 1, wherein said rotating means comprises:
    a power source;
    a motor connected to said power source and including a drive shaft extending forwardly therefrom;
    a plurality of axles supporting said plurality of belts, one said plurality of axles being operably connected to said drive shaft and being contemporaneously rotatable therewith; and
    a switch disposed at said upper end portion of said support member and being connected to said rotating means for selectively controlling same.

7. The assembly of claim 6, wherein said motor further comprising:
    a variable gear connected to said drive shaft and being controllable by said switch so that an operator can selectively control a rotating speed of said plurality of belts.

8. An infant car seat assembly comprising:
    a housing including
        a base member secured thereto and extending along a length thereof, said housing being positionable on a support surface and having a top opening disposed generally medially thereof, and
        a support member having a plurality of lower end portions connected to said base member and extending substantially vertically therefrom respectively, said support member further having an upper end portion spaced from said plurality of lower end portions and extending across a width of said base member, said support member being pivotally connected to said base member and foldable between raised and lowered positions;
    an infant seat carrier connected to said support member and having a lower surface and including a plurality of wheels connected thereto, said infant seat carrier further including a plurality of fastening members connected thereto and being positionable about said housing for maintaining said assembly at a substantially stable position during non-operating conditions;
    a plurality of belts disposed within said housing and for receiving said infant seat carrier thereon through said top opening;
    means for rotating said plurality of belts at a select speed so that said infant seat carrier is caused to roll thereon and simulate a moving vehicle, said rotating means being disposed within said housing and being selectively controllable by an operator;
    a plurality of oppositely disposed scenic window flaps connected to said support member respectively and extending along a length of said housing to thereby provide a scenic view for an infant seated above said seat carrier; and
a connector having opposed end portions pivotally connected to said seat carrier and said support member respectively, said connector member allowing said seat carrier to oscillate during operating conditions.

9. The assembly of claim 8, wherein said plurality of scenic window flaps are pivotally connected to support member to thereby become selectively movable between latitudinal and longitudinal positions, said plurality of scenic window flaps further being pivotal between raised and lowered positions as desired by a user.

10. The assembly of claim 8, wherein said plurality of belts have a plurality of corresponding track portions formed therein, said plurality of track portions being non-linear and for receiving and guiding said plurality of wheels therethrough to simulate natural oscillating vehicle movement.

11. The assembly of claim 8, further comprising:
a plurality of handles attached to said upper end portion of said support member and said base member respectively for assisting a user to transport said assembly between remote positions; and
a quick-release locking latch secured adjacent one said plurality of handles and for removably engaging said base member when said assembly is moved to a folded position.

12. The assembly of claim 8, wherein said rotating means comprises:
a power source;
a motor connected to said power source and including a drive shaft extending forwardly therefrom;
a plurality of axles supporting said plurality of belts, one said plurality of axles being operably connected to said drive shaft and being contemporaneously rotatable therewith; and
a switch disposed at said upper end portion of said support member and being connected to said rotating means for selectively controlling same.

13. The assembly of claim 12, wherein said motor further comprising:
a variable gear connected to said drive shaft and being controllable by said switch so that an operator can selectively control a rotating speed of said plurality of belts.

14. An infant car seat assembly comprising:
a housing including
a base member secured thereto and extending along a length thereof, said housing being positionable on a support surface and having a top opening disposed generally medially thereof, and
a support member having a plurality of lower end portions connected to said base member and extending substantially vertically therefrom respectively, said support member further having an upper end portion spaced from said plurality of lower end portions and extending across a width of said base member, said support member being pivotally connected to said base member and foldable between raised and lowered positions;
an infant seat carrier connected to said support member and having a lower surface and including a plurality of wheels connected thereto, said infant seat carrier further including a plurality of fastening members connected thereto and being positionable about said housing for maintaining said assembly at a substantially stable position during non-operating conditions;
a plurality of belts disposed within said housing and for receiving said infant seat carrier thereon through said top opening;
means for rotating said plurality of belts at a select speed so that said infant seat carrier is caused to roll thereon and simulate a moving vehicle, said rotating means being disposed within said housing and being selectively controllable by an operator;
a plurality of oppositely disposed scenic window flaps connected to said support member respectively and extending along a length of said housing to thereby provide a scenic view for an infant seated above said seat carrier; and
a connector having opposed end portions pivotally connected to said seat carrier and said support member respectively, said connector member allowing said seat carrier to oscillate during operating conditions;
wherein said plurality of scenic window flaps are pivotally connected to support member to thereby become selectively movable between latitudinal and longitudinal positions, said plurality of scenic window flaps further being pivotal between raised and lowered positions as desired by a user.

15. The assembly of claim 14, wherein said plurality of belts have a plurality of corresponding track portions formed therein, said plurality of track portions being non-linear and for receiving and guiding said plurality of wheels therethrough to simulate natural oscillating vehicle movement.

16. The assembly of claim 14, further comprising:
a plurality of handles attached to said upper end portion of said support member and said base member respectively for assisting a user to transport said assembly between remote positions; and
a quick-release locking latch secured adjacent one said plurality of handles and for removably engaging said base member when said assembly is moved to a folded position.

17. The assembly of claim 14, wherein said rotating means comprises:
a power source;
a motor connected to said power source and including a drive shaft extending forwardly therefrom;
a plurality of axles supporting said plurality of belts, one said plurality of axles being operably connected to said drive shaft and being contemporaneously rotatable therewith; and
a switch disposed at said upper end portion of said support member and being connected to said rotating means for selectively controlling same.

18. The assembly of claim 17, wherein said motor further comprising:
a variable gear connected to said drive shaft and being controllable by said switch so that an operator can selectively control a rotating speed of said plurality of belts.

* * * * *